July 5, 1960     M. P. SWEENEY     2,943,911

COKE OVEN BY-PRODUCT RECOVERY PROCESS

Filed Aug. 11, 1953     2 Sheets-Sheet 1

Inventor
Maxwell Patrick Sweeney
By his attorneys
Howson and Howson.

July 5, 1960 M. P. SWEENEY 2,943,911
COKE OVEN BY-PRODUCT RECOVERY PROCESS
Filed Aug. 11, 1953 2 Sheets-Sheet 2

Inventor
Maxwell Patrick Sweeney
By his attorneys
Howson and Howson

2,943,911
COKE OVEN BY-PRODUCT RECOVERY PROCESS

Maxwell Patrick Sweeney, Glenolden, Pa., assignor to United Engineers & Constructors Inc., Philadelphia, Pa., a corporation of Delaware Filed Aug. 11, 1953, Ser. No. 373,497

4 Claims. (Cl. 23—3)

This application pertains to the recovery of by-products from coke oven gases and particularly to an improved method for the recovery of ammonia in a semi-direct type of coke oven by-product recovery process.

One of the valuable by-products recovered from coke oven gas is ammonia. There are three principal methods for the recovery of ammonia from coke oven gases, the indirect, the semi-direct, and the direct process.

In the indirect process, which is the oldest of the three, gas coming from coke ovens is first cooled in a collecting main and is then passed through indirect tubular coolers where its temperature is reduced to say 32° C. with the aid of water. By this means, tar and water vapor are condensed, the water carrying with it some of the ammonia and almost all of the ammonium salts. The gas is then freed from tar fog and enters a series of scrubbers in which it is washed, first with weak ammonia liquor, and then with fresh water. By this means, substantially all of the ammonia is removed from the gases. The resultant ammonia liquor is then distilled and the free ammonia taken off is charged to an ammonia saturator at a temperature of about 100° C., where it is reacted with sulfuric acid to produce ammonium sulfate.

In the direct process, the gases coming from the coke oven collecting means are first run through a tar separator to remove some of the tar, and then at a temperature of about 160° C., the coke oven gas is delivered directly to an ammonia saturater where it is contacted with a mineral acid for the removal of the corresponding ammonium salt.

For various reasons, neither the indirect nor the direct processes have been found entirely satisfactory commercially.

The indirect process involves the use of exceedingly large volumes of liquor, leading to a large plant with high capital investment, large space requirements and the problem of disposing of large quantities of still waste.

The direct process produces inferior tar and ammonium sulfate, and is further hampered by the severe corrosion problem caused by decomposition of the ammonium chloride contained in the gases to hydrogen chloride. The most widely used process for the recovery of ammonia is the semi-direct process.

In the latter process, as it is ordinarily carried out, the gases coming from the collecting mains are first cooled in a primary cooler by direct contact with an aqueous ammoniacal liquor, to about 32° C. By this means, most of the tar and some of the ammonia is removed. Subsequently the gases may be passed through a tar separator to remove tar fog.

At this point in the process, the gases are substantially free of tar and are saturated with water. They are then charged to an ammonia saturator where they are reacted with sulphuric acid to produce ammonium sulfate.

The operating conditions of the saturator are critical and much effort has been made to discover the optimum operating conditions. One of the chief problems in saturator operation is to maintain the water balance, that is, to see that all the water added to the saturator is removed therefrom. If too much water is put in, either with the acid, with the gas, or as recirculated washing liquor from the salt recovery system, and is allowed to accumulate, the resulting product will be large quantities of saturated liquor, but no crystalline salt.

In theory, the heat of reaction of the ammonia and sulfuric acid is enough to evaporate all the water which it is necessary to add, and thus maintain the water balance. But, in practice, the water balance is a sensitive phase of saturator operation, and in the ordinary plant, the amount of water added to the ammonia saturator must be carefully controlled.

It has been suggested that the gas be reheated, out of contact with water, before charging to the saturator, to increase its capacity for removing water. This suggestion has been put into operation in a number of plants and has eased the critical nature of the water balance to some extent. However, the temperature to which the gases can be raised in a reheater is limited by economic considerations to about 60° C., with a corresponding saturator-operating temperature of about 45° C. It should be realized that the ammonia recovered from coke oven gas must compete with synthetic ammonia, and is generally under a price disadvantage as respects synthetic ammonia. Therefore, the construction and operation of large reheater units or fired heaters simply to make saturator operation easier is not feasible from a cost standpoint.

Even with reheating to about 60° C., various shortcomings, directly or indirectly traceable to the need for restricting water addition to the saturator, plague the industry.

Thus, it is found that after the saturator has been operated at normal conditions for a period of time, salt incrustation develops on various parts of the apparatus. When this occurs, large quantities of water must be added to the saturator in a short period of time to dissolve the incrustations. This procedure, which is known as "killing the bath," upsets the saturator operation and results in an uneven production rate and crystal size. In addition, it is wasteful of time and labor.

Moreover, with saturators operating under what have hitherto been considered optimum conditions, the size of the crystals is below that desired.

Moreover, in present saturator operation, the crystalline product is imperfectly washed because of the need for restricting the quantity of wash water which can be returned to the saturator. The residual acid left on the crystals causes decomposition and rotting of the bags in which the product is stored and shipped.

With the problems involved in saturator operation thus outlined, a brief consideration of the remainder of the normal semi-direct process may be given.

The gases leaving the saturator are generally cooled again to about 30° C. and are then scrubbed with an absorber oil to remove light oils. Alternatively, after leaving the saturator, they may be scrubbed to remove naphthalene, then cooled and again scrubbed to remove light oils. After light oil removal, the gases are ready to be delivered to fuel mains or burners.

At some stage in this process, it is necessary to insert a pressure booster or exhauster to keep the gas flowing and to overcome the frictional and static pressure resistance of the apparatus. Where reheaters are used, the compression is generally done after the reheater and before the saturator. If no reheater is employed, an exhauster is generally located immediately before the saturator.

In the usual process, after the gases have emerged from the by-product recovery plant, they are further compressed to an extent depending on the demand, i.e., the pressure required in the fuel mains to which they are delivered.

In general, the pressure used in the exhausters of prior recovery processes has been not higher than about 3 psig, with any further compression being conducted after the gases have emerged from the by-product recovery system.

In the copending applications of Gerald L. Eaton, Serial Nos. 161,325, and 185,665, now Patents No. 2,649,403 and 2,649,405, respectively, processes are described wherein the gases are scrubbed with an absorber oil to recover light oils therefrom at pressures above about 4 p.s.i.g. and in certain cases above about 30 p.s.i.g. in order to facilitate light oil recovery.

It is an object of the present invention to provide a semi-direct coke oven by-product recovery process in which the amount of water which can be added to the ammonia saturator is greatly increased compared to current practice.

It is another object of the invention, to provide a coke oven by-product recovery process in which the necessity for "killing the bath" is eliminated or materially reduced.

It is a further object of the invention to provide a coke oven by-product recovery process in which the average size of the ammonium sulphate crystals obtained from the ammonia saturator may be substantially increased.

It is a further object of the invention, to permit more thorough washing of product salt without upsetting the saturator water balance.

According to the present invention, the above and other objects are obtained by compressing the coke oven gases immediately prior to their entrance into the saturator, and out of contact with water, to at least about 9 p.s.i.g., and preferably to a pressure higher than the pressure required in the fuel mains, i.e., the delivery pressure, by an amount approximately equal to the pressure drop of intervening apparatus, i.e., apparatus lying between the point of compression and the fuel mains. The gases are thereby heated to at least about 103° C. and at that temperature and pressure, are delivered to the saturator. By this means, the saturator-operating temperature is increased to about 55° C. or higher.

Increasing the temperature of operation of the saturator in this fashion has several beneficial effects:

(1) It vaporizes larger quantities of water in the saturator, thus permitting greater quantities of water to enter the saturator without danger of reducing crystallization.

(2) It permits relatively large quantities of water to be deliberately fed into the saturator at specified points, thus preventing incrustation of the saturator at these critical points, and eliminates the necessity for "killing the bath." This, in turn, permits the continuous operation of the saturator for extended periods of time with constant quality of crystal production.

(3) It permits the use of larger quantities of water in washing the salt. By more thoroughly washing the crystals, the quantity of residual acid is reduced, avoiding deliquescence, caking, and rotting of the bags.

(4) By operating the saturator at higher temperatures, the resistance to crystallization is reduced and therefore the size of the crystals, is increased, with less formation of seed crystals.

These benefits are obtained at substantially no increase in cost, since the compression of a major portion of the gases would have to be effected in any case, before their use. By including a relatively high compression step at a point within the recovery system just prior to the ammonia saturator, the present invention uses the heat of compression, which would otherwise be an incidental effect, to great advantage.

It will be appreciated that the upper limit beyond which the gas should not be compressed, will be dictated only by the decomposition temperature of the ammonia salt.

As to the lower limit of compression, it is found that about 9 p.s.i.g. is the minimum pressure at which it will no longer be necessary to "kill the bath," and is therefore the minimum at which continuous recovery of ammonium sulfate crystals becomes practicable.

In general, the gases will be compressed to between about 9 p.s.i.g and about 50 p.s.i.g., preferably to between about 12 p.s.i.g. and about 30 p.s.i.g. The exact temperature at which the gases will leave the booster or compressor will vary with the efficiency of the compressor and with the inlet temperature of the gases. Generally, however, the temperature of the gases will be raised by the compression to between about 103° C. and about 250° C., preferably to between about 119° C. and about 193° C. With the gases entering the saturator at these temperatures and pressures, the saturator may be operated at between about 55° C. and about 100° C. preferably between about 65° C. and about 85° C.

Figure 1:
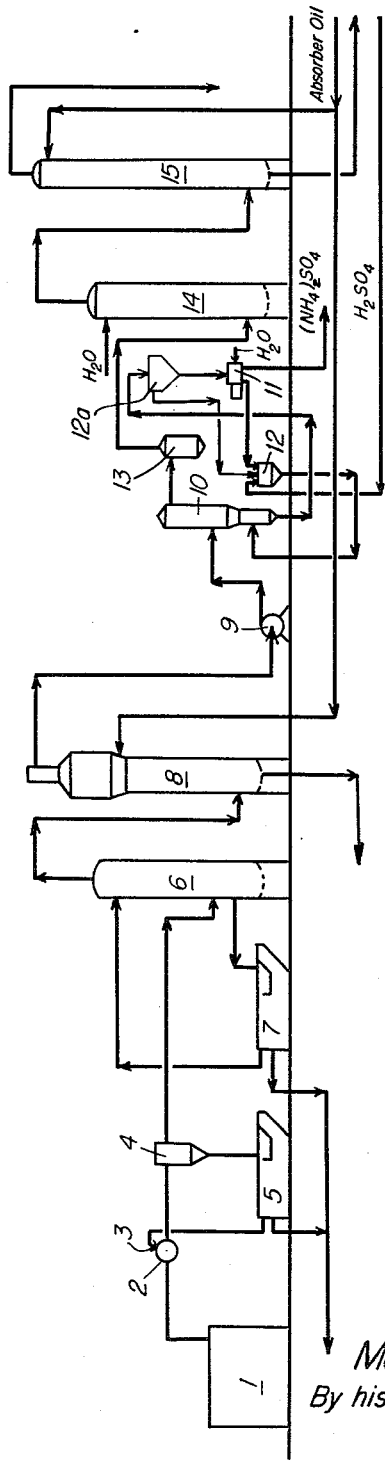
Fig. 1 is a flow diagram of a coke oven by-product recovery process employing my novel method, pressure boosters being located immediately upstream of the ammonia saturator.

It will be understood that the process shown in the drawings is described for purposes of illustration only, and that the invention applies as well to other processes.

Referring to Fig. 1, gases resulting from the destructive distillation of carbonaceous material such as coal, in a coke oven 1, are taken off overhead in a collecting main 2. There they are contacted wtih an aqueous ammoniacal flushing liquor injected as at 3. By this means, the gases are cooled, the tar is precipitated, and a certain amount of ammonia is absorbed.

The foul flushing liquors pass off from the gases through downcomer 4 and are discharged into flushing liquor decanter 5, where they separate into a lower tar layer and an upper aqueous ammoniacal layer.

The upper layer is used in the collecting mains as flushing liquor. The tar may be withdrawn and further processed for the recovery of valuable components, as for example, in my copending application Serial No. 354,542, now Patent No. 2,795,534, or in accordance with the copending application of Gerald L. Eaton, Serial No. 161,325, now Patent No. 2,649,403, or of Thomas G. Reynolds Serial No. 186,886, now Patent No. 2,649,404.

The gasses passing out of downcomer 4 are charged to a primary cooler 6, where they are contacted with an aqueous liquor. By this means, additional ammonia and tar are removed and the temperature of the gases is reduced from between about 60° C. and about 100° C. at the entrance, to between about 20° C. and about 40° C. at the exit of the primary cooler.

The enriched liquors coming from the bottom of the primary cooler are charged to a circulating liquor decanter 7, where two layers are formed, a lower tar layer, and an upper aqueous layer.

The lower tar layer is drawn off and combined with the lower layer from the flushing liquor decanter 5. The upper layer is returned to the primary cooler as scrubbing liquor.

The gases removed from the primary cooler are charged to a naphthalene scrubber 8, where they are contacted with an absorber oil for the removal of naphthalene.

The absorber oil is preferably of the type described in the copending application of Gerald L. Eaton, Serial No. 161,325, now Patent No. 2,649,403, i.e., an oil having an initial point (atmospheric distillation) above about 225° C. and an end point not higher than about 400° C., and which will remove naphthalene from the gases.

The naphthalene-rich absorber oil removed from the bottom of the naphthalene scrubber may be treated for the recovery of naphthalene and regeneration of absorber oil in any desired manner, but preferably in the manner described and claimed in my copending application Serial No. 354,542, now Patent No. 2,795,534, or in the above-mentioned applications of Gerald L. Eaton and Thomas G. Reynolds, Serial Nos. 161,325 and 186,886, now Patents No. 2,649,403 and 2,649,404, respectively.

The gases emanating from the top of the naphthalene scrubber, are at a temperature between about 20° C. and about 40° C. Their pressure is between about 5 and about 50 inches of water below atmospheric pressure.

In accordance with the invention, they are then delivered to a booster 9, where their pressure is raised to between about 9 p.s.i.g. and about 50 p.s.i.g., usually to between about 12 p.s.i.g. and about 30 p.s.i.g. By this means, their temperature is correspondingly increased to between about 103° C. and about 250° C., usually to between about 119° C. and about 193° C. At that pressure and temperature, they are charged to an ammonia saturator 10, for the removal of ammonia.

Figure 2:
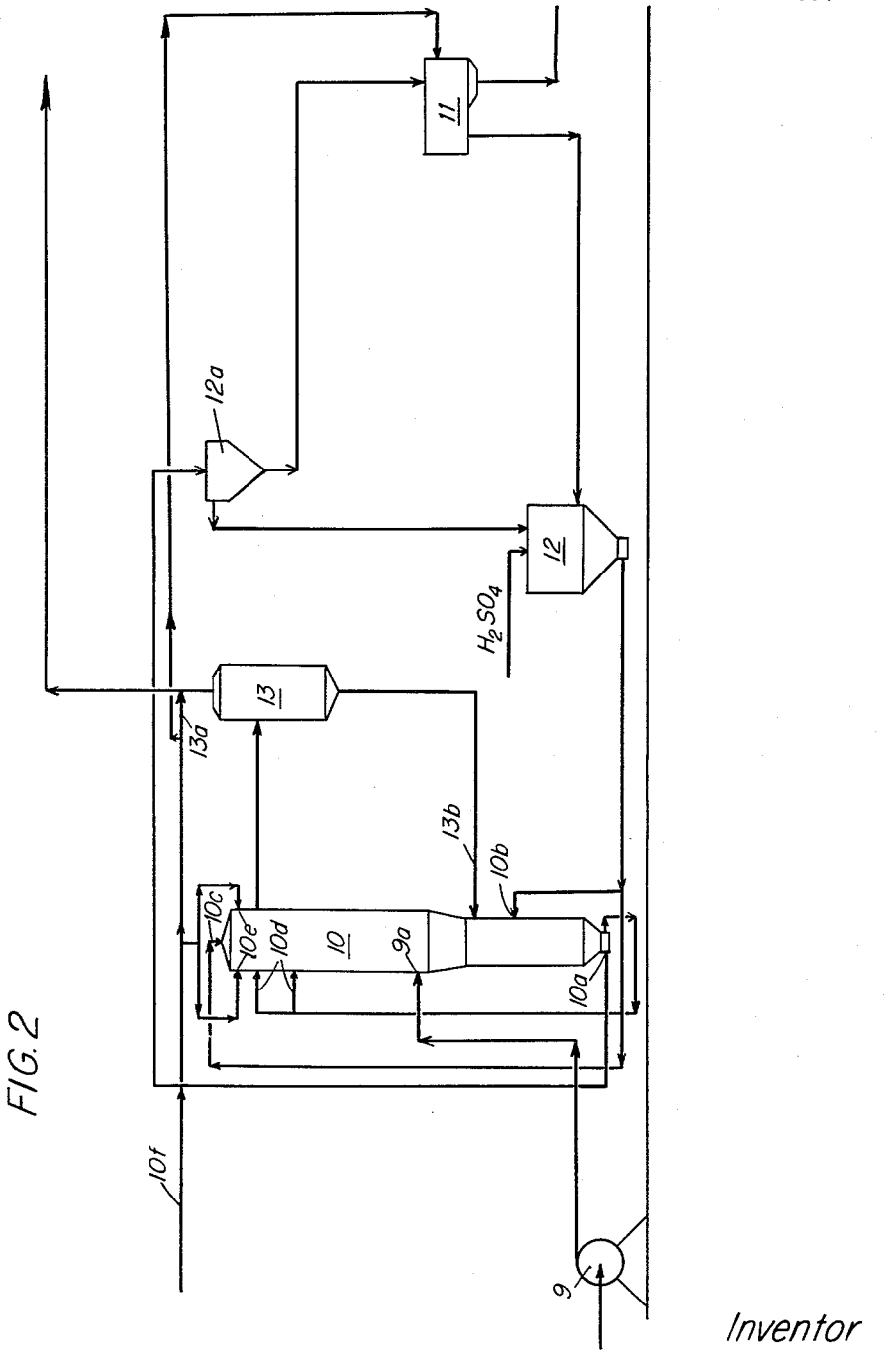
Fig. 2 is a flow diagram showing in more detail the operation of the ammonia saturator system shown also in Fig. 1.

The operation of the ammonia saturator can best be described with reference to Fig. 2, which shows in more detail the various elements of an illustrative saturator system.

The saturator shown in the figures is of the spray type. The compressed gases coming from the booster 9, enter as at 9a, and are met with a spray of dilute sulphuric acid as they pass upwardly through the column.

At the time it contacts the coke oven gases in the saturator, the dilute acid contains between about 1% and about 10% by weight $H_2SO_4$, preferably between about 3 and 6%. The ammonia in the coke oven gases reacts with the sulphuric acid to form ammonium sulphate which falls into the lower portion of the saturator, and is withdrawn therefrom as at 10a in the form of a slurry.

The gases, now freed of ammonia, are charged to an acid catcher 13 to remove entrained acid and sulfate crystals. Here they may be contacted with water, entering through line 13a, to prevent incrustation of salt in the acid catcher. The resulting mixture of water, salt, and acid is returned through the line 13b to the bottom section of the saturator 10, where it functions to prevent incrustation of that part of the saturator.

The coke oven gases emerging from the top of the acid catcher 13, are charged to a final cooler 14, where they are cooled to a temperature between about 15° C. and about 40° C. At this temperature, and at a pressure between about 9 p.s.i.g. and about 50 p.s.i.g., they are delivered to a benzol scrubber 15 where they are contacted with additional absorber oil for the removal of light oils. As they emerge from the benzol scrubber, the coke oven gases are now free of most of the valuable constituents which it is economical to recover, and may be delivered to mains or burners for consumption as fuel, without further compression.

In the saturator 10, the slurry removed from the bottom thereof at 10a is charged to a salt receiver 12a. There, the principal part of the water present in the slurry is decanted and conducted to a mother liquor overflow pot 12. The concentrated slurry separated from the mother liquor in the receiver 12a is delivered to a centrifugal separator 11.

A stream of water is also charged to separator 11 to remove the major portion of the acid remaining on the crystals. The liquid effluent from separator 11 is delivered to the mother liquor overflow pot 12 which pot also receives sulfuric acid make-up. A mixture of the make-up acid, the mother liquor from receiver 12a, and the extracted liquid from separator 11, is drawn off from the bottom of pot 12, and is charged to the saturator 10, a part being delivered to the lower section as at 10b, and part to the top as at 10c.

The portion delivered to the lower part of the saturator aids in preventing incrustation at this point.

To further prevent incrustation in the upper portion of the saturator, a quantity of fresh water is charged at points 10e.

To illustrate the order of magnitude of the increase in water fed to the saturator allowed by the present invention, an example will be given of a typical saturator operation, referring to Fig. 2 of the drawings.

As an example, a delivery from the naphthalene scrubber of 270,000 a.c.f.m. (actual cubic feet per minute) at 31° C., and 13.51 p.s.i.a. will be assumed. The composition of the gas at this point may be taken as (percent by volume):

| | Percent |
|---|---|
| $H_2$ | 55.9 |
| $N_2$ | 5.2 |
| CO | 6.4 |
| $CH_4$ | 24.9 |
| $C_2$ hydrocarbons | 2.6 |
| $CO_2$ | 1.9 |
| $O_2$ | .7 |
| $H_2S$ | .4 |
| $NH_3$ | 1.1 |
| HCN | .1 |
| Benzene, toluene, xylene fraction | .9 |
| | 100.0 |

In the booster 9, this charge is compressed to give 175,000 a.c.f.m. at 115° C. and 26 p.s.i.a., which is the rate of delivery to the saturator.

The resulting gas offtake from the acid catcher will be 176,000 a.c.f.m. at 64° C. and 26 p.s.i.a. Wet (2% $H_2O$) salt production from the centrifuge 11 will be 27,516 pounds per hour.

With this rate of production, some 35,100 pounds per hour of water are introduced through the line 10f, part of this water being charged directly to the saturator, part to the saturator through the acid catcher, and part to the saturator through the centrifugal separator and the pot 12. 25,460 pounds per hour of sulfuric acid (60° Bé.) are introduced into the pot 12. This acid contains 5300 pounds/hour of water, making a total of 40,400 pounds/hour of water added to the saturator system.

Thus, by compressing the gases to 26 p.s.i.a. or to about 11 p.s.i.g., it is possible to add more than 150% water, to the ammonia saturator, based on the weight of the salt obtained. This compares to an optimum addition in a conventional semi-direct process, using saturated gas without reheating, of about 29% based on the weight of the salt. A similar conventional process reheating to 60° C. and with a bath-operating temperature of 45° C., would permit say 40% water based on the weight of the salt, to be added.

It will be understood that although the process has been described in connection with a spray-type saturator, it is not limited to the use of spray apparatus, but may be used to advantage with the conventional Collin or Koppers-type saturator.

By making possible the addition of such greatly increased quantities of water to the ammonia saturator, at substantially no cost increase, the present invention makes it possible to eliminate incrustations within the saturator by the use of auxiliary water sprays as at 10b and 10e in the embodiment illustrated. By eliminating incrustation, "killing the bath" is avoided, and substantially continuous sulfate production is made possible.

In addition, the size of the sulfate crystals obtained is increased, adding to the commercial attractiveness of the product.

Moreover, by permitting the use of increased quantities of wash water in the separator, a product having a lower acid content is obtained, thus preventing decomposition of the bags used for storage and shipment.

It must be emphasized that all the above advantages are obtained with no substantial increase in total cost, since the product gas is almost always compressed above 8 p.s.i.g. prior to use. By shifting the point of high compression upstream, to a point immediately prior to the saturator, what was formerly an incidental effect, i.e., the heat of compression, is used to great advantage.

It will be understood that the process shown in the drawings and described herein is given only for the purposes of illustration and that the invention is not limited to the details thereof.

Thus, it will be noted that naphthalene is shown as removed by means of a wash oil, immediately after the gases have left the primary coolers. This is advantageous because it avoids any possibility of the naphthalene crystallizing after the boosters. However, it is not essential that naphthalene be removed at this point in the process.

The example further provides for the use of sulfuric acid in the saturators, but it will be recognized that the invention may be used with saturators employing other mineral acids such as hydrochloric or phosphoric acid.

What I claim is:

1. In a semi-direct coke oven by-product recovery process, the steps of contacting the gases issuing from coke ovens with an aqueous ammoniacal liquor to remove and recover tar and ammonia therefrom and to cool said gases to between about 20° C. and about 40° C., compressing the cooled coke oven gases to between about 9 p.s.i.g. and about 50 p.s.i.g. and thereby heating said gases to between about 103° C. and about 250° C., and contacting said gases, while said gases are within the last mentioned pressure and temperature ranges, with a dilute mineral acid maintained at a temperature between about 55° C. and about 100° C. by contact with said gases, to remove and recover ammonia from said gases.

2. The method claimed in claim 1 and comprising contacting the cooled coke oven gases at a temperature between about 20° C. and about 40° C. and prior to said compressing step, with an absorber oil to remove and recover naphthalene therefrom.

3. In a semi-direct coke oven by-product recovery process, the steps of contacting coke oven gases with an aqueous ammoniacal liquor to remove and recover tar and ammonia therefrom and to cool said gases to between about 20° C. and about 40° C., contacting said gases with an absorber oil to remove and recover naphthalene therefrom, compressing said coke oven gases to between about 9 p.s.i.g. and about 50 p.s.i.g. and thereby heating said gases to between about 103° C. and about 250° C., contacting said gases, while said gases are within the last mentioned pressure and temperature ranges, with a dilute mineral acid maintained at a temperature between about 55° C. and about 100° C. by contact with said gases, to remove and recover ammonia therefrom, cooling said coke oven gases to between about 15° C. and about 40° C. and then again contacting said gases with an absorber oil to remove and recover light oils therefrom.

4. In a semi-direct coke oven by-product recovery process, wherein coke oven gases are first treated to remove and recover tar and ammonia therefrom with consequent cooling of said gases, are then treated with a mineral acid to remove and recover additional ammonia therefrom and are subsequently delivered to gas mains at a pressure of at least 9 p.s.i.g., the improvement which comprises compressing said coke oven gases immediately prior to said mineral acid ammonia removal and recovery treatment to a pressure higher than said delivery pressure by an amount approximately equal to the pressure drop of intervening apparatus, and not higher than about 50 p.s.i.g., and thereby heating said gases to between about 103° C. and about 250° C., and contacting said gases, while said gases are within the last mentioned pressure and temperature ranges, with a dilute mineral acid maintained at a temperature between about 55° C. and about 100° C. by contact with said gases, to remove and recover ammonia from said gases.

References Cited in the file of this patent

UNITED STATES PATENTS

| | | |
|---|---|---|
| 1,315,639 | Piette | Sept. 9, 1919 |
| 1,408,105 | Lomax | Feb. 28, 1922 |
| 1,880,631 | Wingert | Oct. 4, 1932 |
| 2,383,171 | Tiddy | Aug. 21, 1945 |
| 2,605,169 | Tiddy | July 28, 1952 |
| 2,649,403 | Eaton | Aug. 18, 1953 |
| 2,649,404 | Reynolds | Aug. 18, 1953 |
| 2,675,296 | Gollmar | Apr. 13, 1954 |
| 2,688,533 | Otto | Sept. 7, 1954 |
| 2,720,526 | Sweeney | Oct. 11, 1955 |